(12) United States Patent
Kalish

(10) Patent No.: US 7,873,705 B2
(45) Date of Patent: Jan. 18, 2011

(54) SYSTEM AND METHOD FOR IDENTIFYING CONTENT SERVICE WITHIN CONTENT SERVER

(75) Inventor: Dan Kalish, Rannana (IL)

(73) Assignee: Flash Networks Ltd., Herzeliya (IL)

( * ) Notice: Subject to any disclaimer, the term of this patent is extended or adjusted under 35 U.S.C. 154(b) by 1105 days.

(21) Appl. No.: 10/799,863

(22) Filed: Mar. 12, 2004

(65) Prior Publication Data

US 2005/0204035 A1    Sep. 15, 2005

(51) Int. Cl.
G06F 15/16    (2006.01)
(52) U.S. Cl. .................................. 709/219; 709/217
(58) Field of Classification Search .............. 709/219
See application file for complete search history.

(56) References Cited

U.S. PATENT DOCUMENTS

| | | | |
|---|---|---|---|
| 6,640,097 B2* | 10/2003 | Corrigan et al. | 455/414.1 |
| 6,976,210 B1* | 12/2005 | Silva et al. | 715/205 |
| 7,020,082 B2* | 3/2006 | Bhagavath et al. | 370/230 |
| 7,039,037 B2* | 5/2006 | Wang et al. | 370/349 |
| 2002/0054090 A1* | 5/2002 | Silva et al. | 345/747 |
| 2002/0062467 A1* | 5/2002 | Hunzinger | 714/749 |
| 2002/0138601 A1* | 9/2002 | Piponius et al. | 709/223 |
| 2004/0059809 A1* | 3/2004 | Benedikt et al. | 709/224 |
| 2004/0248558 A1* | 12/2004 | Chandhok | 455/412.1 |
| 2005/0216829 A1* | 9/2005 | Kalinichenko et al. | 715/513 |
| 2006/0117055 A1* | 6/2006 | Doyle | 707/102 |

* cited by examiner

*Primary Examiner*—Vivek Srivastava
*Assistant Examiner*—Ryan J Jakovac
(74) *Attorney, Agent, or Firm*—The Law Office of Michael E. Kondoudis

(57) ABSTRACT

The present invention discloses a new method for identifying current content service visited by a mobile device user within a content server through a cellular network. According to this method the received content from the content provider server is parsed for identifying embedded hyperlinks and respective link titles. The parsed content is analyzed for identifying chosen hyperlinks of previous received content, recording thereof and identifying mobile device location within content server site according to the sequence of at least two successive hyperlinks titles.

22 Claims, 3 Drawing Sheets

SYSTEM AND METHOD FOR IDENTIFYING CONTENT SERVICE WITHIN CONTENT SERVER

BACKGROUND OF THE INVENTION

The present invention relates to wireless network service mediation services. More specifically, the invention relates to a system and method for identifying content services.

It is becoming increasingly common for content to be provided to mobile terminals operating in wireless communication systems, for the purpose of providing mobile terminal users with up-to-date information. Network operators are currently providing information services relating to stock prices, sports, news updates, and the like. Initially, network operators provided such information services by using specific messaging services such as the Short Message Service (SMS). More recently, mobile communication systems have begun to support mobile access to the Internet.

Various communication protocols, including the Wireless Application Protocol (WAP), have been developed to provide mobile access to the Internet. When utilizing WAP protocol for communication, a mobile terminal communicates with a gateway by means of WAP, and the gateway communicates with content servers via HTTP to obtain content in the form of Wireless Mark-up Language (WML).

Proxy servers are traditionally used for intermediating between mobile devices and Internet network service applications and for securing the communication thereof. In more advanced systems, the proxy servers are used for improving the navigation and content delivery from the network application and for providing enhanced control and monitoring over these services by implementing for example caching and error detection techniques, access control, billing and reporting, etc.

The management and control of content servers and services requires the ability to identify the various content services residing on a server for various purposes such as tracking usage of a specific service; differentiated billing based on user-applications rather than host or domain; personalization; selective content adaptation and branding tailored for a specific application or surfing area, access control and caching, etc.

According to prior art methodologies the content identification of content services and applications are based on identifying the respective URL addresses of the specific content service. The URL is typically identified by a prefix (e.g. "www.somesite.com/news/*" could identify the sports section of a web-site). This method has serious shortcomings given that web services today frequently utilize dynamic URL's that are mechanically produced. Such automatic URL's frequently provide no hint as to the specific application being used (e.g. "www.somesite.com/ad6eb37433a9083ac?uid=452372" may identify any content service within the somesite.com website), hence differentiation between different services residing on the same host is frequently impossible. Furthermore with URL-based identification methodology, whenever the URL address structure is changed or the hosting location of the service is changed, the proxy server cannot find the correlation between old and new URL representations. Also, if the proxy contains configurations that identify the service e.g. by URL or URL prefix, these configurations may not be sufficient for identifying the service or specific sections within the service, as the URL may have no unique pattern which identifies it. For this reason, this methodology is not suitable for content providers implementing dynamic URL techniques. The dynamic URL consists of changing code numbers, that only the content provider itself can identify in real-time, hence it is impossible for proxy servers to relate the dynamic URL codes (when visited by the client) to the specific content or service.

For example, suppose a proxy server with access control utilities aimed at restricting mobile users' access to specific content information or services according to predetermined rules. These rules may relate to security restrictions, payment requirements or any customized restrictions (such as age restriction to sex-related content). Such proxy would require a robust, configurable and maintainable method for identifying the various applications within the mobile content sites.

It is a main object of the invention to avoid the limitation of prior art proxy servers and enable content services identification for content providers that utilize dynamic URL techniques or that require robust tracking of services across changing URL representations.

SUMMARY OF THE INVENTION

The present invention provides a new method for identifying current content service visited by a mobile device user within a content server through a cellular network, said method comprising the steps of: Parsing the received content from the content provider server for identifying embedded hyperlinks and respective link titles, analyzing user requests for identifying chosen hyperlinks of previous received content and recording thereof and identifying mobile device location within content server site according to the sequence of at least two successive hyperlinks titles;

BRIEF DESCRIPTION OF THE DRAWINGS

These and further features and advantages of the invention will become more clearly understood in light of the ensuing description of a few preferred embodiments thereof, given by way of example only, with reference to the accompanying drawings, wherein.

DETAILED DESCRIPTION OF THE PREFERRED EMBODIMENTS

Figure 1:
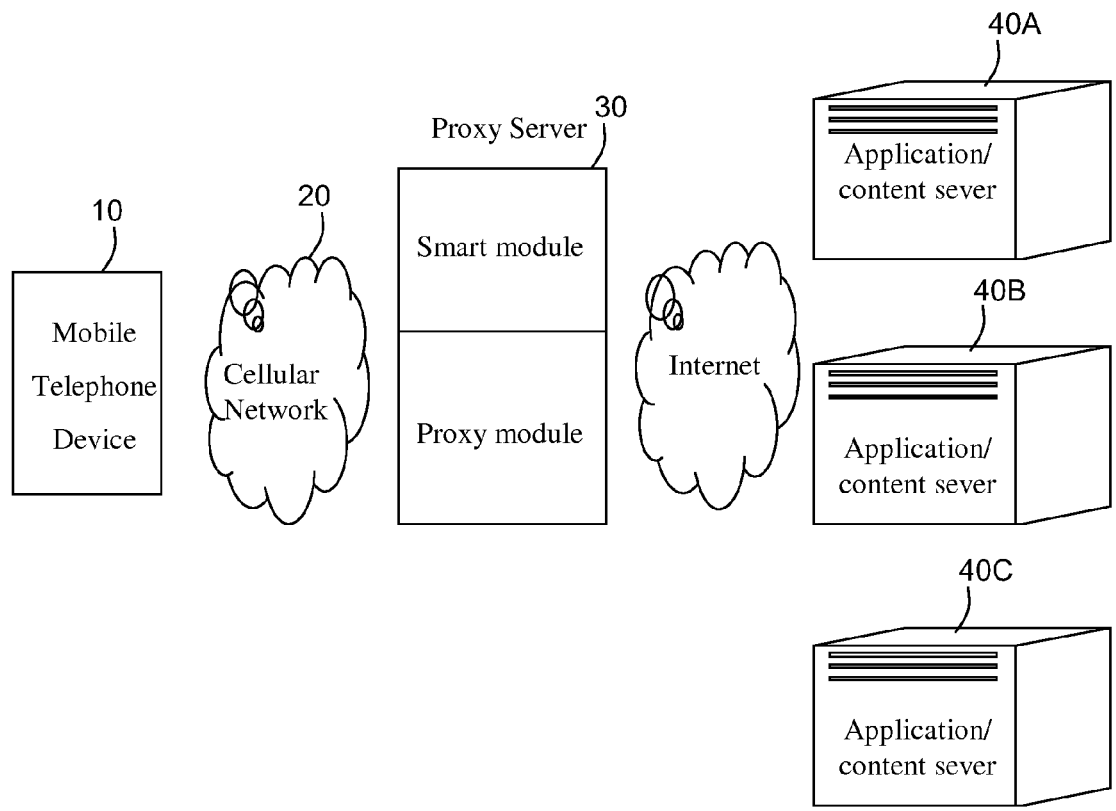
FIG. 1 is a general diagrammatic representation of the environment in which the present invention is practiced.

FIG. 1 illustrates one possible network configuration, in which the present invention can be implemented.

Referring to FIG. 1 of the drawings, it will be seen that a mobile telephone device 10 is connected through a cellular network 20 to the designated server 30 (hereinafter called "the smart proxy server"). The smart proxy server functions as an intermediary gateway between the user mobile device and the Internet content providers 40 (hereinafter called "content servers"), which contain data available for user access.

According to the present invention it is suggested to design supplementary proxy server modules for analyzing and managing user requests, thus providing users with integrative and efficient services. The proxy supplementary modules (smart proxy server) essentially take an active part in mobile devices sessions with various content and information service providers.

Figure 2:
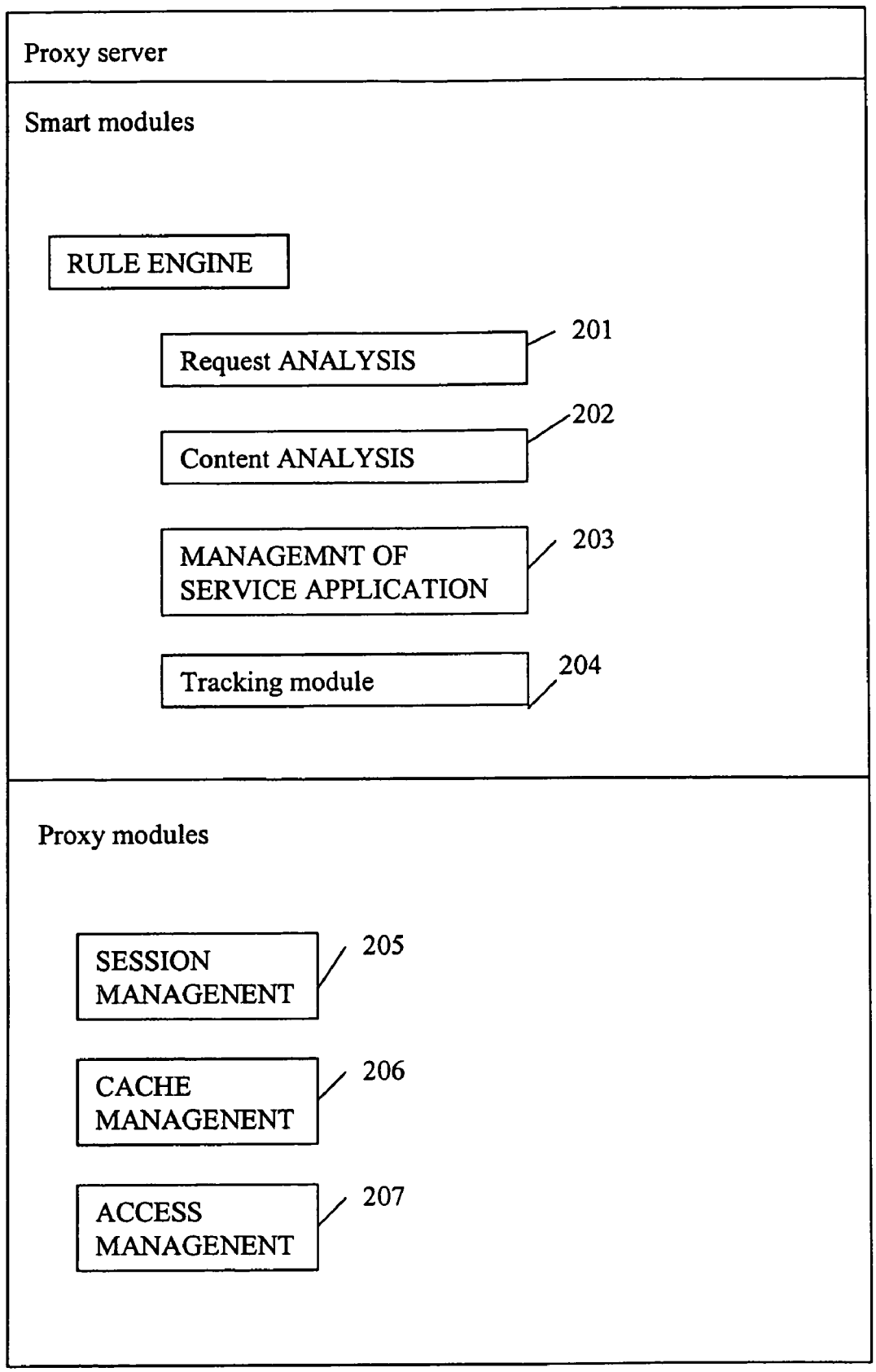
FIG. 2 is a block diagram of the proxy server modules according to the present invention.

FIG. 2 illustrates a block diagram of the smart proxy server modules; the supplementary module of the proxy server includes a request analysis module (201) for identifying request type and destination and recording user surfing track; a content analysis module (202) for parsing the content received from 20 the service provider and identifying the hyperlinks' titles; and a service management module (203) for identifying content services identity according to tracked hyperlink path.

The smart proxy server further includes a conventional proxy module. This module includes an access management module (205), cache management module (206) and session management module (207).

Such enhanced proxy servers enable different utilities, which provide efficient content services and other advanced services to the mobile users.

One of the preferred utilities of the smart proxy concerns the proxy server's ability to provide identification of content services even when the URL addresses are dynamic as opposed to prior art proxy servers which are only able to provide such services where the URLs are permanent addresses.

Figure 3:
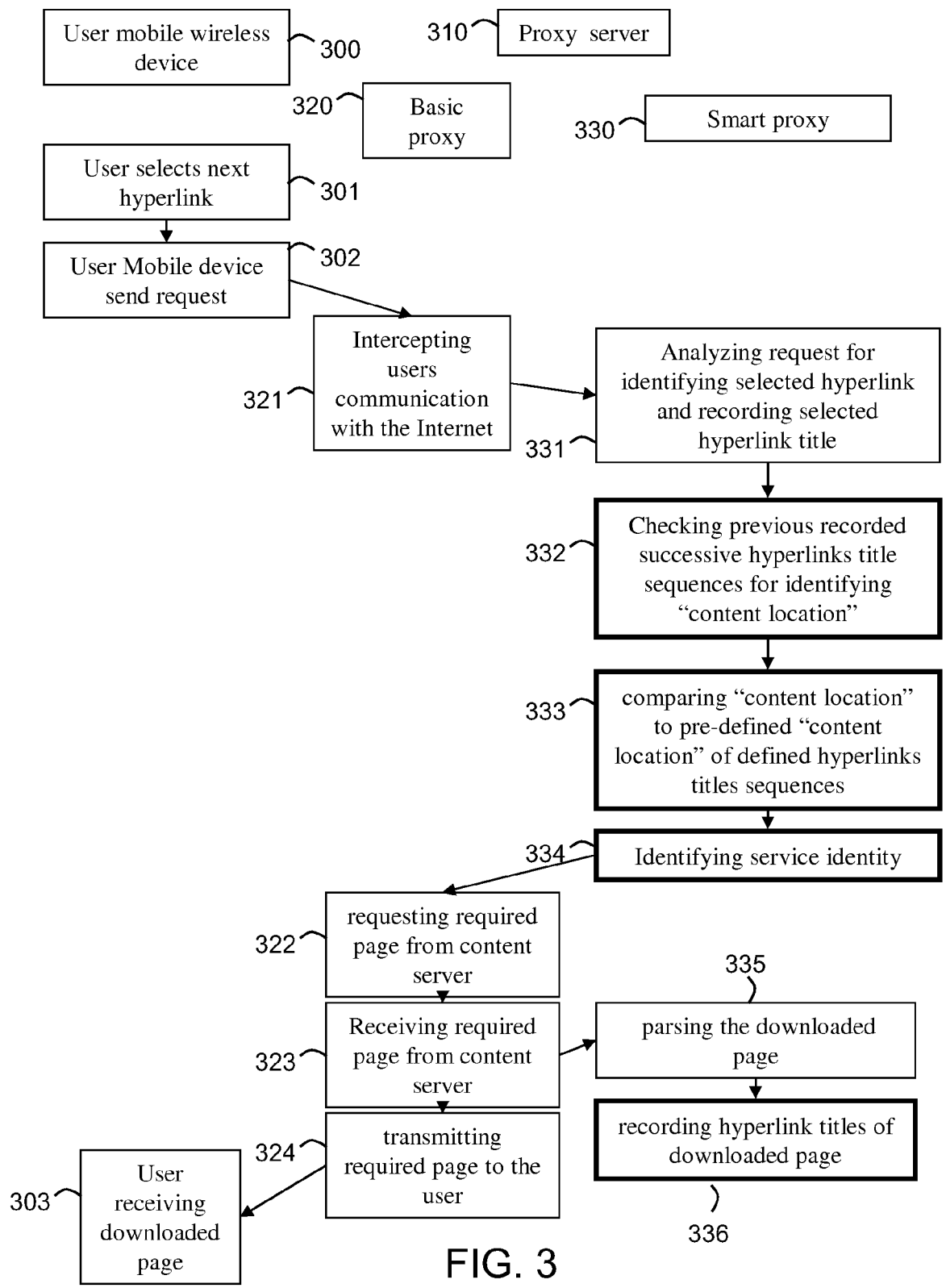
FIG. 3 is a flow-chart representing the process of identifying content service by tracking user navigation track according to the present invention.

FIG. 3 shows the data flow according to the present invention. On user mobile wireless device 300, the user selects next hyperlink 301. In response, the mobile device sends the request 302. The proxy server 310 comprises a basic proxy and a smart proxy 330 (also hereinafter: server content analysis module). In operation, basic proxy 320 intercepts user's communication with the internet 321. The smart proxy 330 analyzes request for identifying selected hyperlink 331, checks previous recorded successive hyperlinks titles sequences for identifying content location 332, compares content location with predefined content location of titles sequences 333, identify content service 334. The basic proxy 320, upon request of a required page 322, receives required page from content server 323 and transmits required page to the user 324, which receives the downloaded page 303. The smart proxy in response parses the downloaded page 335 and records hyperlink titles of downloaded page 336.

In embodiments, smart proxy 330 (proxy server content analysis module) is arranged for parsing the markup content and identifying embedded hyperlinks and respective titles. The smart proxy server tracks user surfing course by recording user's hyperlink selection in the short-term memory of the proxy. Thus, the proxy server can identify the current location of the mobile user within the content provider site on the basis of mobile users' recent navigation track. For example, if the proxy server is required to restrict unauthorized users from accessing a pornographic content page, the server checks user recorded navigation track of hyperlink titles, (e.g. Yahoo —>Society —>relationship —>pornography) and compares this titles' sequence to pre-defined sequence of titles that were defined by the proxy operator. If the sequence of hyperlink titles of the user surfing-track is similar (or equivalent) to one of the predefined sequences, indicating unauthorized access, the proxy server rejects user last request. This capability of identifying user content/service location within content provider site can be utilized for any service of the proxy server which is associated with the content server processing, such as the mediating services between the content server and back-end services. Analyzing user context enables activation of such back-end services based on user-surfing context. For example if the user selected a menu category which requires payment, the proxy server can identify this user's request as a billable request and report the transaction to the necessary back-end server for the user to be billed.

An example of an additional embodiment of the proposed method could be for the proxy element to register the hyperlink titles denoting the users' surfing-path in persistent storage for future analysis, and for an offline process to analyze the hyperlink-title sequences through which the user has visited and to perform various processes accordingly. E.g. such method could be used for producing usage-reports of content services or for producing offline billing records for viewed content.

The service of identification and storage of hyperlink title paths can be further utilized for displaying the sequence of visited hyperlinks, thus enabling users to identify and return to previously visited (hyperlinks) services.

In order for mobile devices to properly display requested content, such content requires processing that is tailored to the different mobile devices' specification. The content processing differs for each content service. Hence, it is suggested to use the service identification capability for selecting the proper content processing and enhancements to be performed on the markup content before delivery to the mobile device.

The service identification can also be of use to the relevant service provider, who can track users' activities for billing purposes.

Although described herein as a proxy-server functionality, the described service identification module functionality can be implemented in part or in whole within the user agent device. The implementations and utilizations of the technology remain similar, while the tracking and recording of hyperlink title paths is performed on the client instead of on a network proxy server.

While the above description contains many specificities, these should not be construed as limitations on the scope of the invention, but rather as exemplifications of the preferred embodiments. Those skilled in the art will envision other possible variations that are within its scope. Accordingly, the scope of the invention should be determined not by the embodiments illustrated, but by the appended claims and their legal equivalents.

What is claimed is:

1. A method for determining the activation of proxy server services user who is using at least one cellular network to visit content accessed by various hyperlinks that are associated with a content server, through at least one proxy server, the contextual location relating to a communication link currently used by the mobile device user, the method being executed by the at least one proxy server, the method comprising:

configuring proxy services actions by defining for each service a sequences of hyperlinks titles of the content server which correspond to contextual location within the content server, wherein said defining is preformed by the proxy server operator;

receiving, from the content server and through the at least one proxy server, user visited content that includes embedded hyperlinks that are each associated with a corresponding title and a corresponding target uniform resource locator (URL), wherein each title is presented to the user over a webpage having a different URL than the target URL;

parsing the received content, extracting the embedded hyperlinks and their corresponding titles and target URLs, and storing the hyperlinks, each title being associated with a respective target URL, wherein each target URL is a dynamic URL comprising periodically changing code numbers identifiable, in real-time, only by the content server;

upon receiving a subsequent URL request, extracting a corresponding hyperlink title from a previously stored hyperlink based on the subsequently requested target URL;

creating a short term user surfing course comprising a sequence of hyperlink titles and a corresponding target URLs sequence; and identifying the contextual location of mobile device user within the content server by (i) comparing the sequence of user selected hyperlink titles of the short term user surfing course with a plurality of predefined sequences of titles stored in a database wherein the predefined sequences of titles were defined by the proxy operator, and (ii) identifying at least partial selected sequence which is similar to hyperlinks titles sequence in the database, wherein each hyperlinks titles sequence in the database is associated with a corresponding contextual location, determining the activation at least one proxy server service, wherein the activation of the service is based on the identified contextual location of the user, wherein: the receiving, the parsing, the identifying, and the comparing are performed by at least one computer throughout the user surfing session.

2. The method of claim 1, wherein the proxy server services include accessing control utilities enabling access restriction to specific content according to content location as defined by the hyperlinks title sequence corresponding to access restrictions defined by the proxy operator.

3. The method of claim 1 the proxy server services include caching utilities enabling to identify cached content by the proxy server according the identified content location.

4. The method of claim 1 the proxy server services include billing applications by applying billing rules by the proxy server in accordance with the identified content location.

5. The method of claim 1, wherein the identification of the location within the content server site is arranged for data retrieval services comprising retrieving required data from respective data source according to the identified location within the content server site.

6. The method of claim 1, further comprising processing the content to fit user mobile device specifications wherein the identification of the location within the content server site is arranged for selecting content processing before delivery to the mobile device.

7. The method of claim 1, wherein the identification of the location within the content server site is arranged for sampling the usage of the location and providing usage statistical analysis.

8. The method of claim 1, further comprising displaying the sequence of hyperlink titles to the user for enabling the identification of previously visited content services.

9. The method of claim 8, wherein the service identification is arranged for tracking users' activities for billing purposes.

10. The method of claim 8 wherein the identification of services by the user is arranged for enabling the user to return to the services.

11. The method of claim 1, wherein the service identification module functionality is implemented at least in part within the user device.

12. A system for determining the activation of proxy server services, utilizing at least one cellular network to visit content by accessing various hyperlinks, through at least one proxy server, over a cellular network, said system comprising:

an interface module, a content analysis module;

a tracking module, and an activation module wherein the interface module is arranged to Configure proxy services actions by defining for each service a sequences of hyperlinks titles of the content server which correspond to contextual location within the content server, wherein said defining is preformed by the proxy server operator;

wherein the content analysis module is arranged to:

receive user visited content from the content server, the content exhibiting embedded hyperlinks each associated with corresponding title and corresponding target uniform resource locator (URL), wherein each title is presented to the user over a webpage having a different URL than the target URL;

parse the received content and extract the embedded hyperlinks and their corresponding titles and dynamic URLs and store the hyperlinks wherein each title is associated with its corresponding target_URL, wherein each target URL is a dynamic URL comprising periodically changing code numbers identifiable, in real-time, only by the content server; and upon receiving a subsequent URL request, extract corresponding hyperlink title from previously stored hyperlink according to presently received URL based on the subsequently requested target; and create a short term user surfing course comprising a sequence of user selected hyperlink titles and their corresponding dynamic URLs;

wherein the tracking module is arranged to identify the mobile device user contextual location within content server by comparing the sequence of user selected hyperlink titles of the short term user surfing course with a plurality of predefined sequences of titles stored on a database, wherein the predefined sequences of titles were defined by the proxy operator;

and wherein the activation module is arranged to determine the activation at least one proxy server service, wherein the activation of the service is based on the identified contextual location of the user.

13. The system of claim 12, wherein the identification of the location within the content server site is arranged for access control utilities enabling access restriction to specific content according to content location as defined by the hyperlinks title sequence.

14. The system of claim 12, wherein the identification of location within content server site is arranged for caching utilities enabling to identify cached content according the identified content location.

15. The system of claim 12, wherein the identified contextual location within content server site is used for enabling applying billing rules, which take into account the identified location.

16. The system of claim 12 wherein the identification of location within content server site is arranged for data retrieval services for retrieving required data from respective data source.

17. The system of claim 12, further comprising a processing module for adapting the content to user mobile device specifications wherein the identification of the location within the content server site is arranged for selecting the respective content processing to be performed on the content before delivery to the mobile device.

18. The system of claim 12, wherein the identification of the location within the content server site is arranged for sampling the usage of said location and providing usage statistical analysis.

19. The system of claim 12, further comprising displaying the sequence of hyperlink titles to the user for identifying previously visited services.

20. The system of claim 12, wherein the tracking module is arranged for tracking users' activities for billing services.

21. The system of claim 12, wherein the identification of content location by the user is arranged for enabling the user to return to a predefined content location.

22. The system of claims 12, wherein the content analysis module is implemented within an existing gateway or proxy on the network.

* * * * *